(12) United States Patent
Hsu

(10) Patent No.: US 7,152,834 B2
(45) Date of Patent: Dec. 26, 2006

(54) ADJUSTABLE ATTACHMENT DEVICE FOR ATTACHING AN OBJECT TO A TUBULAR MEMBER

(76) Inventor: Feng Ling Hsu, No. 4, Alley 2, Lane 167, Tung An Road, Tainan City (TW)

( * ) Notice: Subject to any disclaimer, the term of this patent is extended or adjusted under 35 U.S.C. 154(b) by 88 days.

(21) Appl. No.: 10/755,891

(22) Filed: Jan. 12, 2004

(65) Prior Publication Data

US 2005/0151040 A1   Jul. 14, 2005

(51) Int. Cl.
  *A47B 96/06*   (2006.01)
  *A47F 5/00*   (2006.01)
(52) U.S. Cl. ............... 248/230.1; 248/214; 248/288.31
(58) Field of Classification Search ............ 248/230.1, 248/230.6, 230.8, 231.71, 288.31, 288.51, 248/479–484, 278.1, 231.85, 316.1, 309.1, 248/313, 214; 362/191, 474; 224/448, 456, 224/461, 462
See application file for complete search history.

(56) References Cited

U.S. PATENT DOCUMENTS

| | | | | |
|---|---|---|---|---|
| 3,962,575 A | * | 6/1976 | Vandenberg et al. | 248/340 |
| 4,214,688 A | * | 7/1980 | Griffin, Jr. | 224/197 |
| 4,617,916 A | * | 10/1986 | LeVahn et al. | 600/228 |
| 4,867,404 A | * | 9/1989 | Harrington et al. | 606/46 |
| 5,271,651 A | * | 12/1993 | Blatt et al. | 294/88 |
| 5,664,746 A | * | 9/1997 | Benzakarya | 248/106 |
| 5,690,416 A | * | 11/1997 | Van Gennep | 362/191 |
| 5,860,728 A | * | 1/1999 | Maglica | 362/191 |
| 5,979,724 A | * | 11/1999 | Loewenthal et al. | 224/483 |
| 6,138,970 A | * | 10/2000 | Sohrt et al. | 248/278.1 |
| 6,493,982 B1 | * | 12/2002 | Macaluso | 43/25 |
| 2005/0151040 A1 | * | 7/2005 | Hsu | 248/214 |

\* cited by examiner

*Primary Examiner*—Carl D. Friedman
*Assistant Examiner*—Tan Le
(74) *Attorney, Agent, or Firm*—Charles E. Baxley

(57) ABSTRACT

An adjustable attachment device includes a clamping member for securely clamping a tubular member, a sleeve securely mounted to the clamping member, a ball received in the sleeve, a connecting seat having a portion securely coupled to the ball to move therewith, and a resilient member. The sleeve includes a longitudinal through-hole. Further, the sleeve includes a cutout passing through an upper end of the longitudinal through-hole. The resilient member biases the ball to press against a spherical upper wall section of the sleeve, thereby retaining the connecting seat in place. The connecting seat is pressable to compress the resilient member and cause the ball to disengage from the spherical upper wall section of the sleeve, allowing the connecting seat to move along the cutout of the sleeve and allowing the connecting seat to turn to a desired orientation relative to the tubular member.

5 Claims, 6 Drawing Sheets

ADJUSTABLE ATTACHMENT DEVICE FOR ATTACHING AN OBJECT TO A TUBULAR MEMBER

BACKGROUND OF THE INVENTION

1. Field of the Invention

The present invention relates to an attachment device. In particular, the present invention relates to an adjustable attachment device for attaching an object such as a lamp or a decoration to a tubular member of e.g., a bicycle while allowing adjustment of the orientation of the object relative to the tubular member.

2. Description of the Related Art

It is not uncommon to attach an object such as a lamp, a decoration, or an accessory to a tubular member of, e.g., a bicycle, a shopping cart, a bed, etc. The object has an end typically welded to the tubular member and thus could not be adjusted. Quick-release devices have been proposed to attach an object to a tubular member, yet the orientation of the object relative to the tubular member still could not be adjusted. The present invention is intended to provide an adjustable attachment device to solve this problem.

SUMMARY OF THE INVENTION

An object of the present invention is to provide an adjustable attachment device for attaching an object to a tubular member while allowing adjustment of the orientation of the object relative to the tubular member.

In accordance with an aspect of the invention, an adjustable attachment device includes a clamping member for securely clamping a tubular member, a sleeve, a ball, a connecting seat, and a resilient member. The clamping member includes an engaging portion having a receiving hole. The sleeve is securely mounted to the engaging portion of the clamping member. The sleeve includes a longitudinal through-hole having an upper end. The longitudinal through-hole further includes a spherical upper wall section. Further, the sleeve includes a cutout passing through the upper end of the longitudinal through-hole of the sleeve.

The ball is received in the sleeve. The upper end of the longitudinal through-hole of the sleeve has a diameter smaller than an outer diameter of the ball. The connecting seat includes a portion securely coupled to the ball to move therewith. An object is mounted to the connecting seat to move therewith. The resilient member biases the ball to press against the spherical upper wall section of the sleeve, thereby retaining the connecting seat in place.

The connecting seat is pressable to compress the resilient member and cause the ball to disengage from the spherical upper wall section of the sleeve, allowing the connecting seat to move along the cutout of the sleeve and allowing the connecting seat to turn to a desired orientation relative to the tubular member.

In an embodiment of the invention, the engaging portion of the clamping member has an outer threading, and the sleeve has an inner threading for engaging with the outer threading of the clamping member. The resilient member includes a body sandwiched between the tubular member and the clamping member. The resilient member further includes a resilient protrusion integrally formed with the body. The resilient protrusion exerts a force to press the ball against the spherical upper wall section of the sleeve.

The ball includes a through-hole, and the connecting seat includes an engaging rod having a receptacle. An engaging element extends through the through-hole of the ball and the receptacle of the engaging rod. The through-hole of the ball includes an enlarged lower end, and the engaging element has an enlarged lower end engaged in the enlarged lower end of the through-hole of the ball.

In another embodiment of the invention, the sleeve includes a flange formed on a lower end of an inner periphery delimiting the longitudinal through-hole of the sleeve. The resilient member is a spring attached between the flange of the sleeve and the ball.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
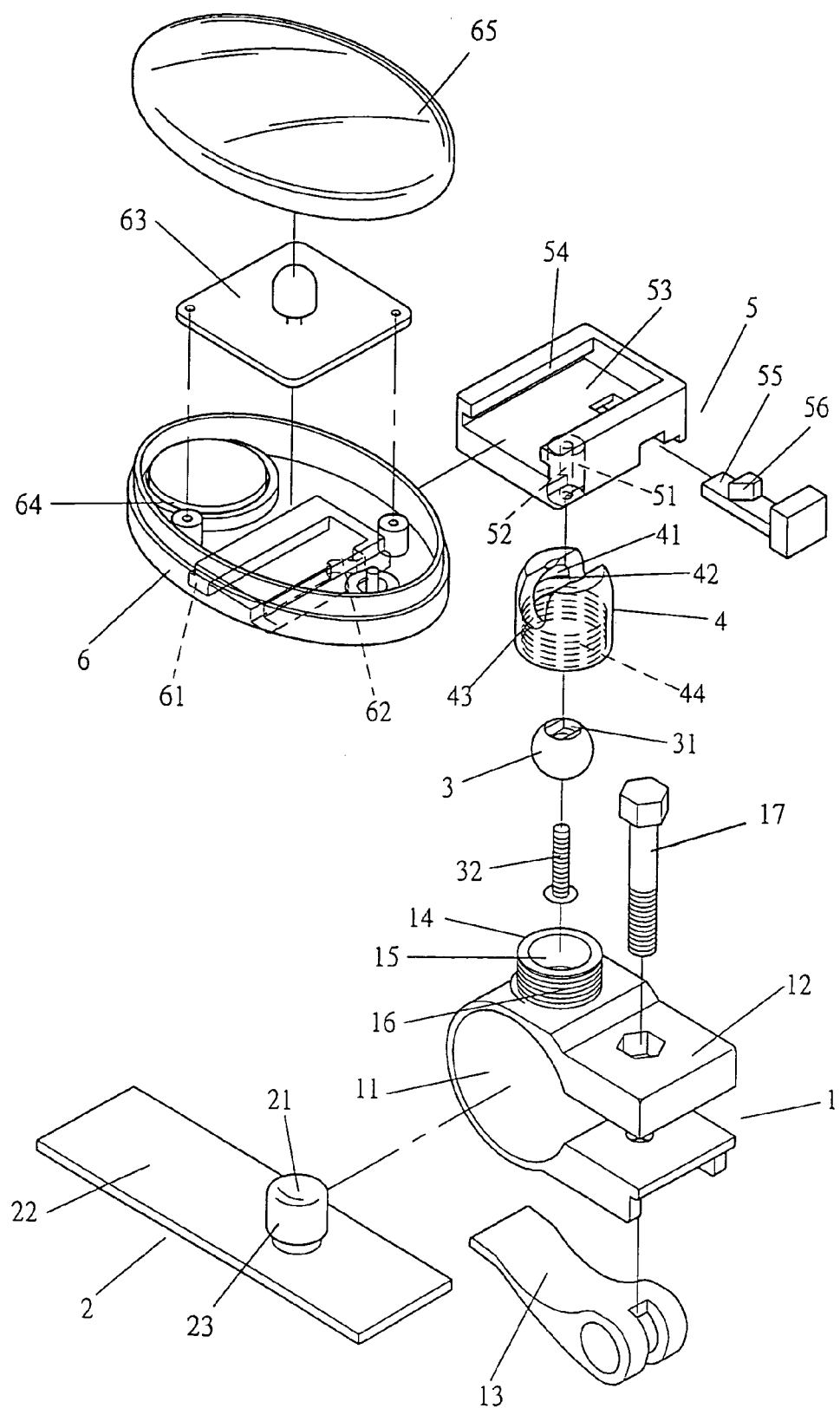
FIG. 1 is an exploded perspective view of an adjustable attachment device in accordance with the present invention.
Figure 2:
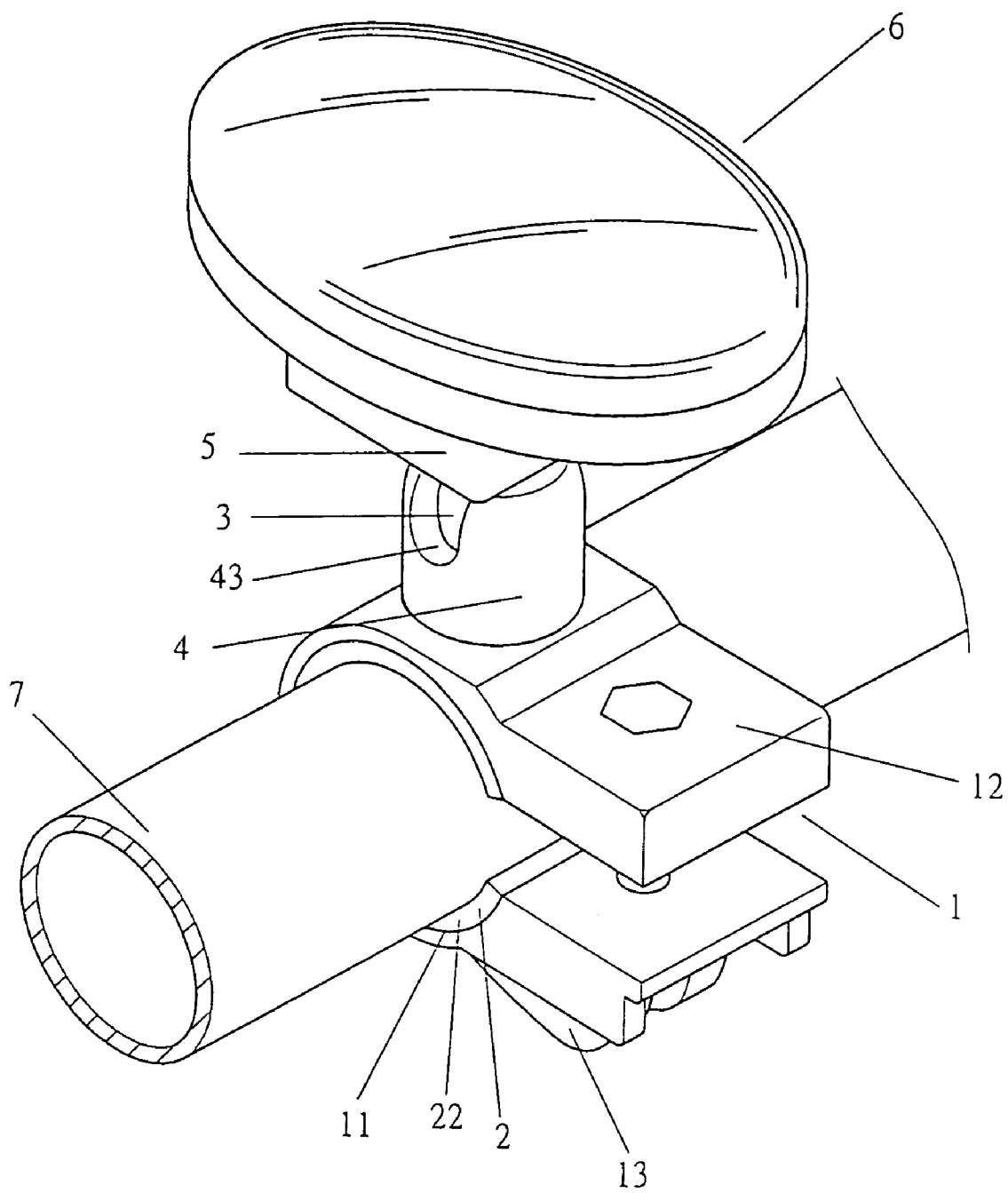
FIG. 2 is a perspective view of the adjustable attachment device in accordance with the present invention and a tubular member to which the adjustable attachment device is attached.
Figure 3:
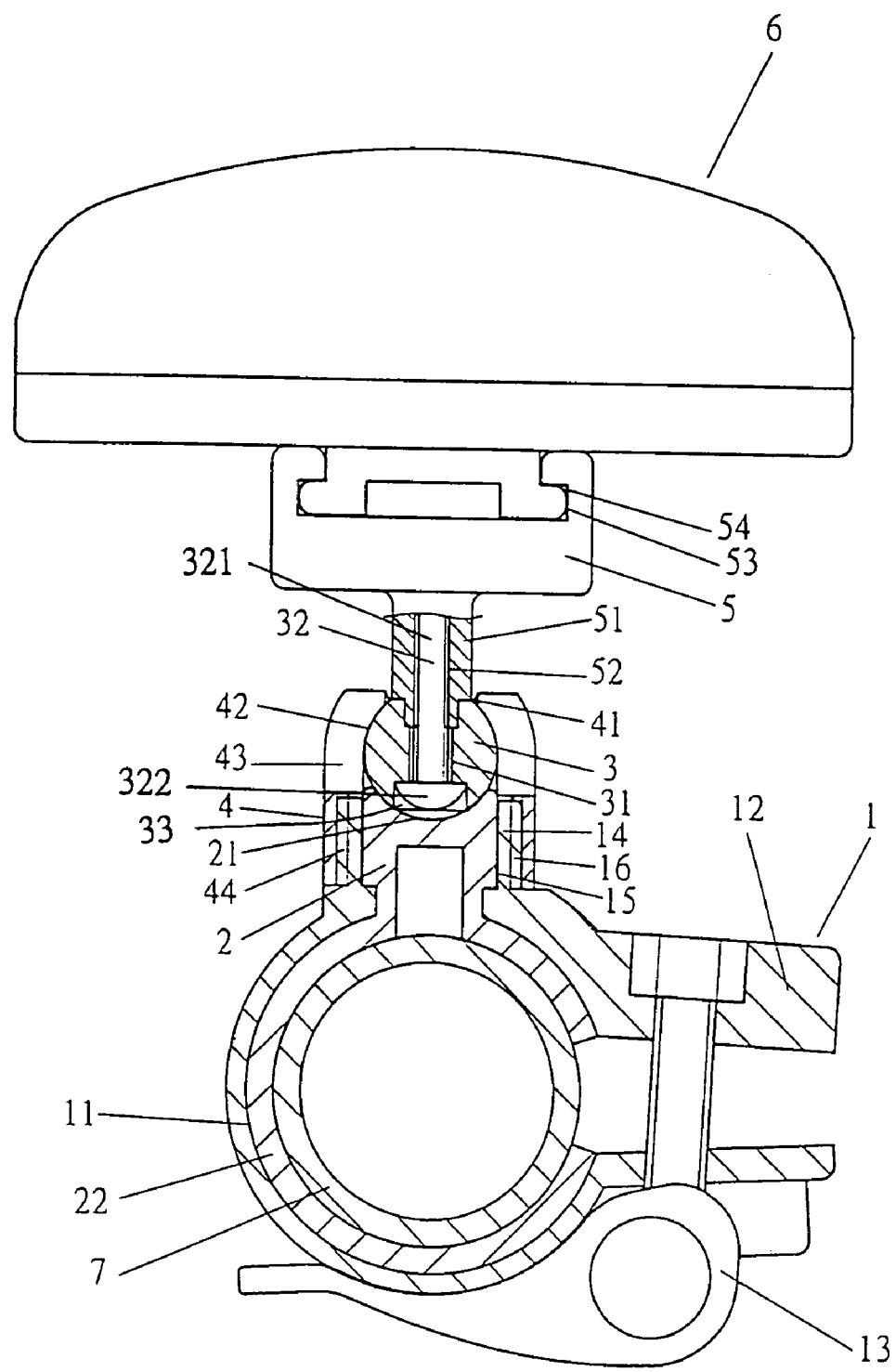
FIG. 3 is a sectional view of the adjustable attachment device and the tubular member in FIG. 2.

Referring to FIGS. 1 through 3, an adjustable attachment device in accordance with the present invention generally comprises a clamping member 1, a resilient member 2, a ball 3, a sleeve 4, and a connecting seat 5 to which an object (such as a lamp seat 6) is attached. The clamping seat 1 is substantially C-shaped, defining a hole 11 for securely holding a tubular member 7 (FIG. 2) of, e.g., a bicycle, a shopping cart, a bed, etc. The clamping member 1 further includes two mutually facing end portions 12, with a bolt 17 extending through the end portions 12 and with a lever 13 being attached to the bolt 17 so that the lever 13 can be moved between a clamping position in which the clamping member 1 securely clamps tubular member 7 and a release position in which the tubular member 7 is not clamped by the clamping member 1. Such a quick-release structure is well known and therefore not further described. The clamping member 1 further includes an engaging portion 14 having a receiving hole 15 and an outer threading 16.

The resilient member 2 includes a substantially C-shaped body 22 that is securely sandwiched between the tubular member 7 and an inner periphery delimiting the hole 11 of the clamping member 1, best shown in FIG. 3. The coiled body 22 is flat before mounting, as shown in FIG. 1. The resilient member 2 further includes a protrusion 23 on an outer periphery of the coiled body 22, with an arcuate groove 21 being defined in the protrusion 23. The ball 3 includes a through-hole 31 through which an engaging element 32 extends. The sleeve 4 is substantially cylindrical and includes a longitudinal through-hole (not labeled) having an upper end 42 whose diameter is smaller than an outer diameter of the ball 3. The through-hole of the sleeve 4 includes a spherical upper wall section 41. A cutout 43 is defined in an upper end of the sleeve 4 and passes through the upper end 42 of the longitudinal through-hole of the sleeve 4. The sleeve 4 further includes an inner threading 44 in a lower end thereof for threadedly engaging with the outer threading 16 of the clamping member 1.

An engaging rod 51 extends from a lower end of the connecting seat 5, with a lower end of the engaging rod 51 being located in the ball 3. As shown in FIG. 3, the engaging element 32 has an upper end 321 extending into a receptacle 52 in the engaging rod 51 and an enlarged lower end 322 engaged in an enlarged lower end 33 of the through-hole 31 of the ball 3. The connecting seat 5 further includes an attaching portion 53 to which the lamp seat 6 is attached. The attaching portion 53 includes an insertion groove 54, a positioning member 55, and a protrusion 56 formed on the positioning member 55.

The lamp seat 6 includes an engaging portion 61 for engaging with the connecting seat 5. The engaging portion 61 includes a positioning hole 62 for engaging with the protrusion 56 of the connecting seat 5. Further, a circuit board 63, a battery 64, and a lid 65 are mounted to the lamp seat 6. The lamp seat 6 can be replaced with other objects.

In assembly, the ball 3 is mounted into the sleeve 4. Then, the ball 3 is securely connected by the engaging element 32 to the engaging rod 51 of the connecting seat 5 to move therewith. Next, the resilient member 2 is inserted into the receiving hole 15 of the clamping member 1, and the inner threading 44 of the sleeve 4 is engaged with the outer threading 16 of the clamping member 1, with a wall delimiting the arcuate groove 21 being in contact with a lower portion of the ball 3, and with an upper portion of the ball 3 pressing against the spherical upper wall section 41 of the sleeve 4 under the action of the resilient protrusion 23. Thus, assembly is completed without the need of a bulky machine and without the risk of disengagement of the ball 3. The engaging portion 61 of the lamp seat 6 is engaged with the engaging portion 53 of the connecting seat 5. The body 22 of the resilient member 2 sandwiched between the clamping seat 1 and the tubular member 7 provides an improved clamping effect.

Figure 4:
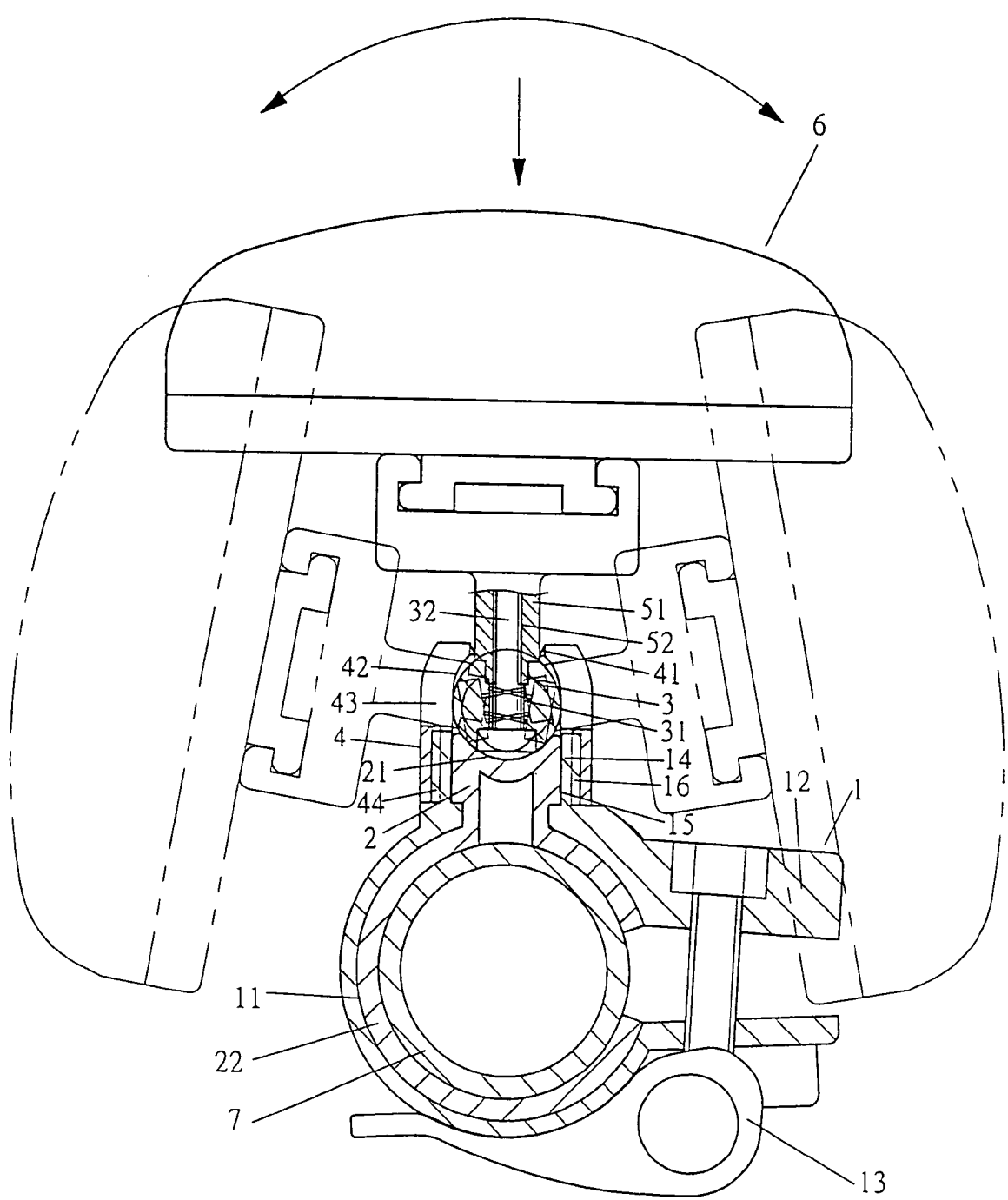
FIG. 4 is a sectional view similar to FIG. 3, illustrating adjustment of the adjustable attachment device along a direction.
Figure 5:
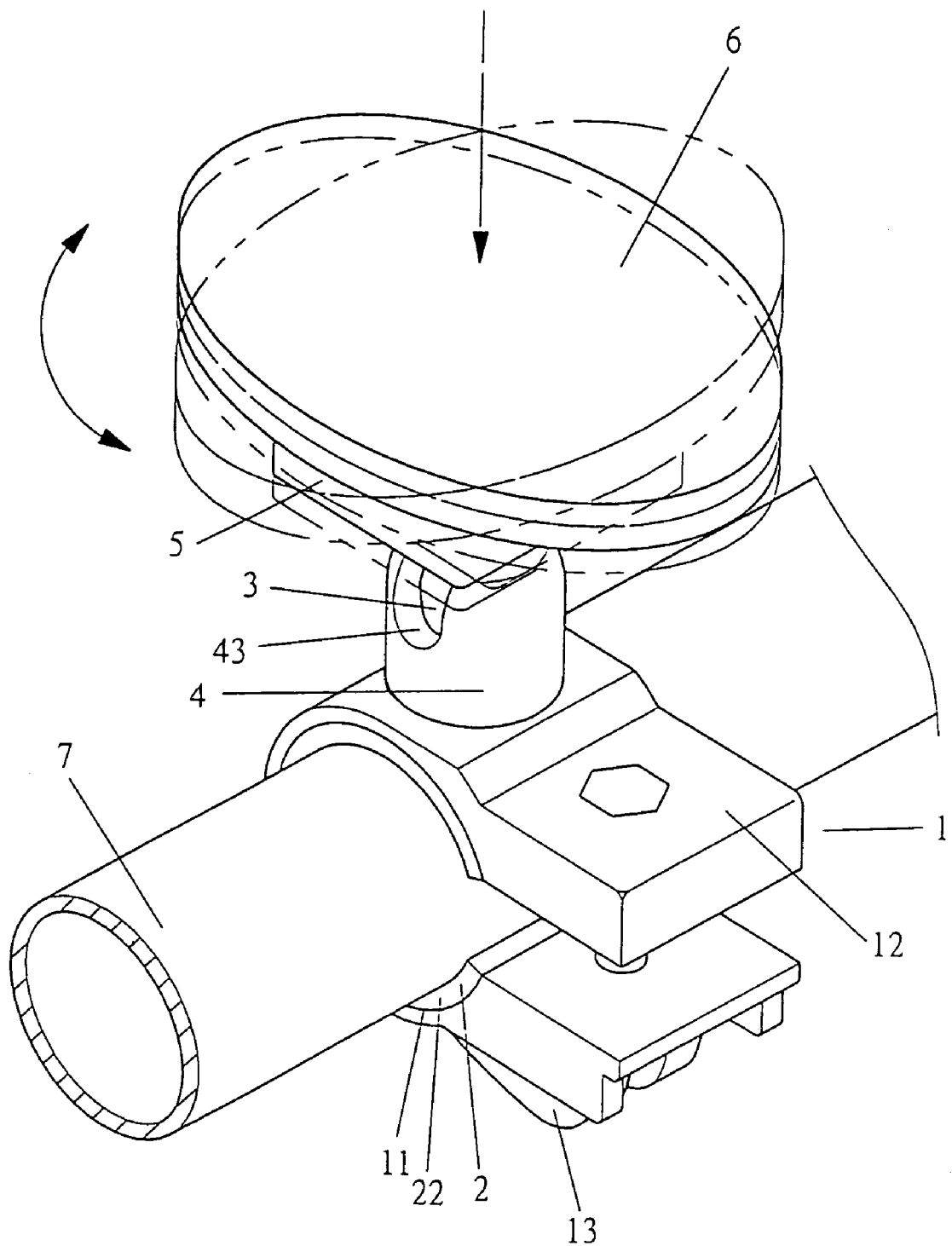
FIG. 5 is a perspective view similar to FIG. 2, illustrating adjustment of the adjustable attachment device in another direction.

Referring to FIG. 4, the lamp seat 6 can be pushed downward and thus compresses the resilient protrusion 23 of the resilient member 2 and causes the upper portion of the ball 3 to disengage from the spherical upper wall section 41 of the sleeve 4. Thus, the engaging rod 51 of the connecting seat 5 may move along the cutout 43 for adjusting the position of the lamp seat 6 in the extending direction of the cutout 43. Further, the connecting seat 5 and the lamp seat 6 may jointly rotate to a desired angular position relative to the tubular member 7, as shown in FIG. 5. After adjustment, the connecting seat 5 and the lamp seat 6 return to their original position and retained in place under the action of the resilient member 2; namely, the ball 3 presses against the spherical upper wall section 41 of the sleeve 4, with the lamp seat 6 being located in a desired orientation relative to the tubular member 7.

Figure 6:
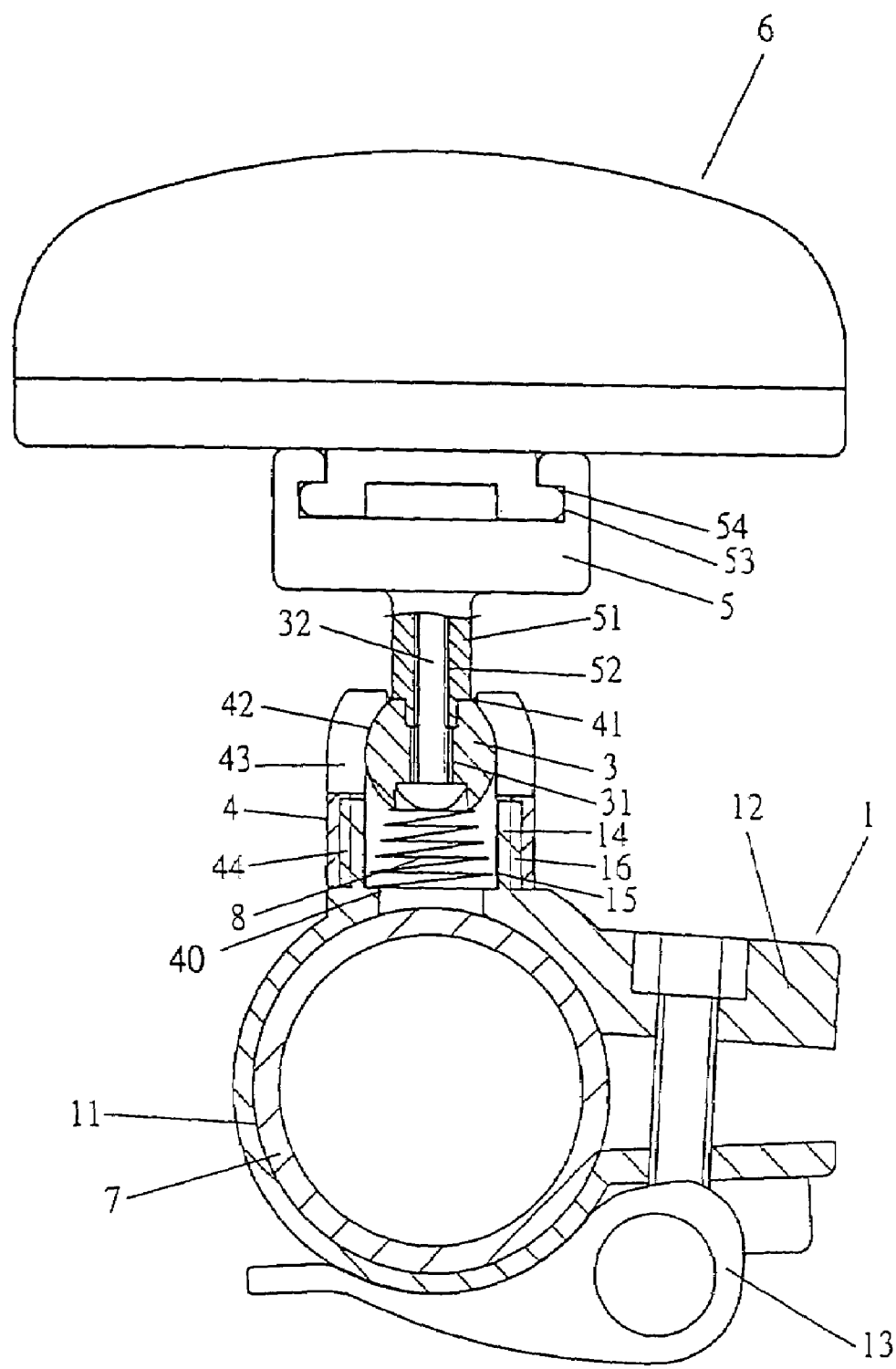
FIG. 6 is a sectional view similar to FIG. 3, illustrating a modified embodiment of the adjustable attachment device in accordance with the present invention.

FIG. 6 illustrates a modified embodiment of the invention, wherein the resilient member is in the form of a spring 8 attached between the ball 3 and a flange 40 formed on a lower end of an inner periphery of the sleeve 4.

In view of the foregoing, the adjustable attachment device in accordance with the present invention provides the following advantages:

1. An object, such as a lamp, a decoration, etc., can be attached by the adjustable attachment device to a tubular member of, e.g., a bicycle, shopping cart, etc., while allowing the object to be adjusted to a desired orientation.

2. Adjustment of the orientation of the object can be easily adjusted by means of pushing the connecting seat downward and rotating the object to the desired orientation and then releasing the connecting seat. The connecting seat returns to its original position under the action of the resilient member, providing operational convenience.

3. No bulky machine is required for mounting the ball 3 into the sleeve 4 via the upper end 41 of the longitudinal through-hole of the sleeve 4. Damage to the ball 3 and the sleeve 4 is avoided. Further, disengagement of the ball 3 from the sleeve 4 is avoided even if the ball 3 is subjected to a relatively large external force, providing improved assembling stability and improved assembling reliability.

4. The clamping effect between the clamping seat 1 and the tubular member 7 is improved by the coiled body 22 of the resilient member 2.

Although the invention has been explained in relation to its preferred embodiments, it is to be understood that many other possible modifications and variations can be made without departing from the scope of the invention as hereinafter claimed.

What is claimed is:

1. An adjustable attachment device comprising:
    a clamping member adapted to securely clamp a tubular member, the clamping member including an engaging portion having a receiving hole;
    a sleeve securely mounted to the engaging portion of the clamping member, the sleeve including a longitudinal through-hole having an upper end, the longitudinal through-hole further including a spherical upper wall section, the sleeve further including a cutout passing through the upper end of the longitudinal through hole of the sleeve;
    a ball received in the sleeve, the upper end of the longitudinal through-hole of the sleeve having a diameter smaller than an outer diameter of the ball;
    a connecting seat including a portion securely coupled to the ball to move therewith, an object being adapted to be mounted to the connecting seat to move therewith; and
    a resilient member for biasing the ball to press against the spherical upper wall section of the sleeve, thereby retaining the connecting seat in place;
    wherein the connecting seat is pressable to compress the resilient member and cause the ball to disengage from the spherical upper wall section of the sleeve, allowing the connecting seat to move along the cutout of the sleeve and allowing the connecting seat to turn to a desired orientation relative to the tubular member wherein the engaging portion of the clamping member has an outer threading, and wherein the sleeve has an inner threading for engaging with the outer threading of the clamping member.

2. The adjustable attachment device as claims in claim 1, wherein the resilient member includes a body sandwiched between the tubular member and the clamping member, the resilient member further including a resilient protrusion integrally formed with the body, the resilient protrusion exerting a force to press the ball against the spherical upper wall section of the sleeve.

3. The adjustable attachment device as claims in claim 1, wherein the ball includes a through-hole, the connecting seat including an engaging rod having a receptacle, further including an engaging element extending through the through-hole of the ball and the receptacle of the engaging rod.

4. The adjustable attachment device as claimed in claim 3, wherein the through-hole of the ball includes an enlarged lower end, and wherein the engaging element has an enlarged lower end engaged in the enlarged lower end of the through-hole of the ball.

5. The adjustable attachment device as claimed in claim 1, wherein the sleeve includes a flange formed on a lower end of an inner periphery delimiting the longitudinal through-hole of the sleeve, the resilient member being a spring attached between the flange of the sleeve and the ball.

* * * * *